(12) United States Patent
Vargantwar et al.

(10) Patent No.: US 8,774,153 B1
(45) Date of Patent: Jul. 8, 2014

(54) BASE STATION CODE PROCESSING ASSISTANCE FOR A CODE DIVISION MULTIPLEX FORMAT

(75) Inventors: Sachin R. Vargantwar, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1205 days.

(21) Appl. No.: 12/691,274

(22) Filed: Jan. 21, 2010

(51) Int. Cl.
*H04B 7/216* (2006.01)

(52) U.S. Cl.
USPC ............ 370/342; 370/320; 370/335; 370/441

(58) Field of Classification Search
USPC .......................................................... 370/342
See application file for complete search history.

(56) References Cited

U.S. PATENT DOCUMENTS

| | | | |
|---|---|---|---|
| 5,515,369 A | 5/1996 | Flammer, III et al. | |
| 6,647,053 B1 | 11/2003 | Garces | |
| 6,847,916 B1 * | 1/2005 | Ying | 702/183 |
| 7,016,399 B1 * | 3/2006 | Vadgama et al. | 375/148 |
| 7,103,026 B2 * | 9/2006 | Hall et al. | 370/335 |
| 7,962,142 B2 * | 6/2011 | O'Neill et al. | 455/439 |
| 2004/0151148 A1 * | 8/2004 | Yahagi | 370/338 |
| 2005/0124299 A1 * | 6/2005 | Scribano et al. | 455/68 |
| 2009/0040982 A1 * | 2/2009 | Ho et al. | 370/331 |
| 2009/0046767 A1 * | 2/2009 | Tinnakornsrisuphap et al. | 375/211 |
| 2011/0164593 A1 * | 7/2011 | Huet et al. | 370/333 |
| 2011/0216662 A1 * | 9/2011 | Nie et al. | 370/252 |

* cited by examiner

*Primary Examiner* — Guang Li (57) ABSTRACT

A first base station transceiver wirelessly receives communications from a first user in a code division multiplexing format using a first code assigned to the first base station transceiver. A second base station transceiver wirelessly receives communications from a second user in the code division multiplexing format using a second code assigned to the second base station transceiver. The base station transceivers determine and transfer wireless communication performance measurements. A network control system selects the second base station transceiver to assist the first base station transceiver based on the communication performance measurements. In response, the second base station transceiver wirelessly receives communications from a third user in the code division multiplexing format using the first code assigned to the first base station transceiver.

18 Claims, 5 Drawing Sheets

BASE STATION CODE PROCESSING ASSISTANCE FOR A CODE DIVISION MULTIPLEX FORMAT

TECHNICAL BACKGROUND

Wireless communication systems use code division multiplexing to separate wireless communications exchanged between various base station transceivers and wireless communication users. In a code division multiplexing system, base station transceivers and users are each assigned codes. Examples of the codes include long codes, short codes, and Walsh codes. The base station transceivers wirelessly broadcast signals that can be processed to derive these codes.

A given wireless user device selects a base station transceiver for service and determines the applicable codes for the selected a base station transceiver. The wireless user device then logically combines its communications with the codes for the selected base station transceiver for wireless transmission. The selected base station transceiver uses these codes to separate these communications from other communications from different users or intended for different base station transceivers.

OVERVIEW

A first base station transceiver wirelessly receives communications from a first user in a code division multiplexing format using a first code assigned to the first base station transceiver. A second base station transceiver wirelessly receives communications from a second user in the code division multiplexing format using a second code assigned to the second base station transceiver. The base station transceivers determine and transfer wireless communication performance measurements. A network control system selects the second base station transceiver to assist the first base station transceiver based on the communication performance measurements. In response, the second base station transceiver wirelessly receives communications from a third user in the code division multiplexing format using the first code assigned to the first base station transceiver.

DETAILED DESCRIPTION

Figure 1:
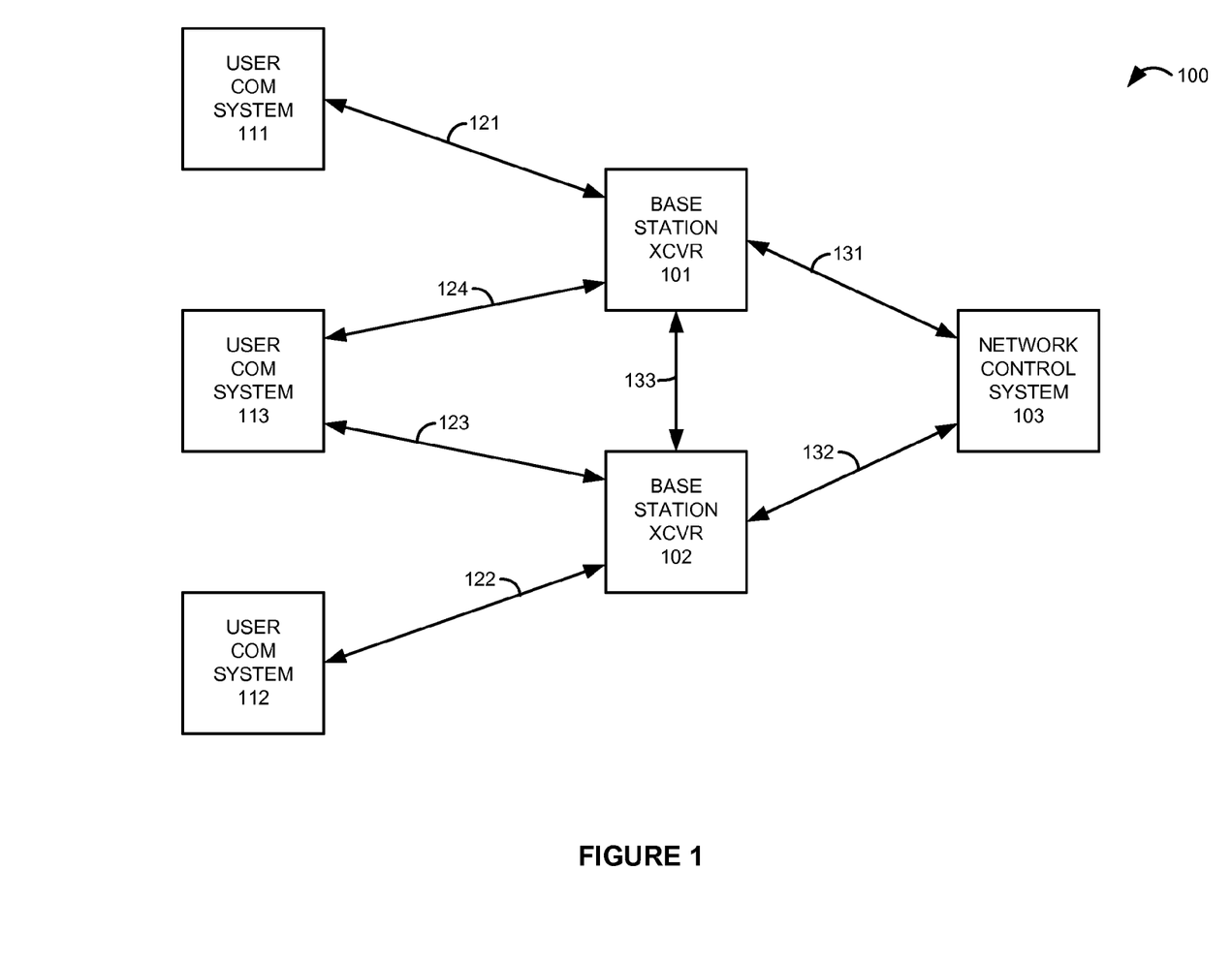
FIG. 1 illustrates a communication system that provides base station code processing assistance for a code division multiplex format.

FIG. 1 illustrates communication system 100 that provides base station code processing assistance for a code division multiplex format. Communication system 100 comprises base station transceivers 101-102, network control system 103, and user communication systems 111-113. User communication systems 111-113 are equipment capable of network communication, such as computers, telephones, servers, cameras, media players, e-books, internet appliances, data storage devices, and the like.

For a code division multiplexing format, a first code is assigned to base station transceiver 101, and a second code is assigned to base station transceiver 102. User communication system 111 and base station transceiver 101 use the first code to exchange wireless communications 121 in the code division multiplexing format. User communication system 112 and base station transceiver 102 use the second code to exchange wireless communications 122 in the code division multiplexing format.

Base station transceiver 101 measures the performance of its wireless communications to generate measurement data, such as radio noise levels, signal-to-noise ratios, error levels, alarms, and the like. Base station transceiver 101 and network control system 103 and exchange control data 131 that indicates the measurement data. Likewise, base station transceiver 102 measures the performance of its wireless communications to generate its own measurement data, such as radio noise levels, signal-to-noise ratios, error levels, alarms, and the like. Base station transceiver 102 and network control system 103 and exchange control data 132 that indicates this measurement data.

Network control system 103 processes the measurement data from base station transceiver 101 to determine that base station 101 requires assistance. For example, network control system 103 might determine that base station transceiver 101 has a radio noise level that exceeds a first threshold. Network control system 103 processes the measurement data from base station transceiver 102 to determine that it can assist base station transceiver 101. For example, network control system 103 might determine that base station 102 has a radio noise levels that fall below a second threshold. Network control system 103 generates and transfers assistance instructions to base station transceivers 101-102 indicating that base station 102 will provide code processing assistance to base station 101. Control data 131-132 carries the assistance instructions from control system 103 to base station transceivers 101-102.

User communication system 113 uses the first code to transfer wireless communications 123 that are intended for base station transceiver 101, but base station transceiver 101 is experiencing a significant performance issue and cannot handle wireless communications 123. In response to the assistance instructions, base station transceiver 102 uses the first code (assigned to base station transceiver 101) to receive wireless communications 123 in the code division multiplexing format. This might entail base station transceiver 102 allocating code processing circuitry to decode wireless signals using the first code.

Base station transceiver 102 has various processing alternatives. In some examples, wireless communications 123 include a session request from user communication system 113. Base station transceiver 102 transfers control data 133 indicating the session request to base station transceiver 101. In response to the session request, base station transceiver 101 uses the first code to exchange wireless communications 124 to register and provide a communication service to user communication system 113.

In other examples, wireless communications 123 include a session request from user communication system 113. Base station transceiver 102 exchanges wireless communications 123 to register to user communication system 113. Registration typically includes base station transceiver 102 exchanging control data 132 with network control system 103 to authenticate and authorize user communication system 113. Base station transceiver 102 transfers control data 133 indicating the registration to base station transceiver 101. In response to the registration, base station transceiver 101 uses the first code to exchange wireless communications 124 to provide a communication service to user communication system 113.

In yet other examples, wireless communications 123 include a session request from user communication system 113. Base station transceiver 102 exchanges wireless communications 123 to register to user communication system 113. In response to the registration, base station transceiver 102 continues to use the first code to provide a communication service to user communication system 113.

Note that only a few base stations are depicted on FIG. 1 for clarity, but other base stations could also provide assistance (either contemporaneously or subsequently) to base station 101 in a similar manner.

Figure 2:
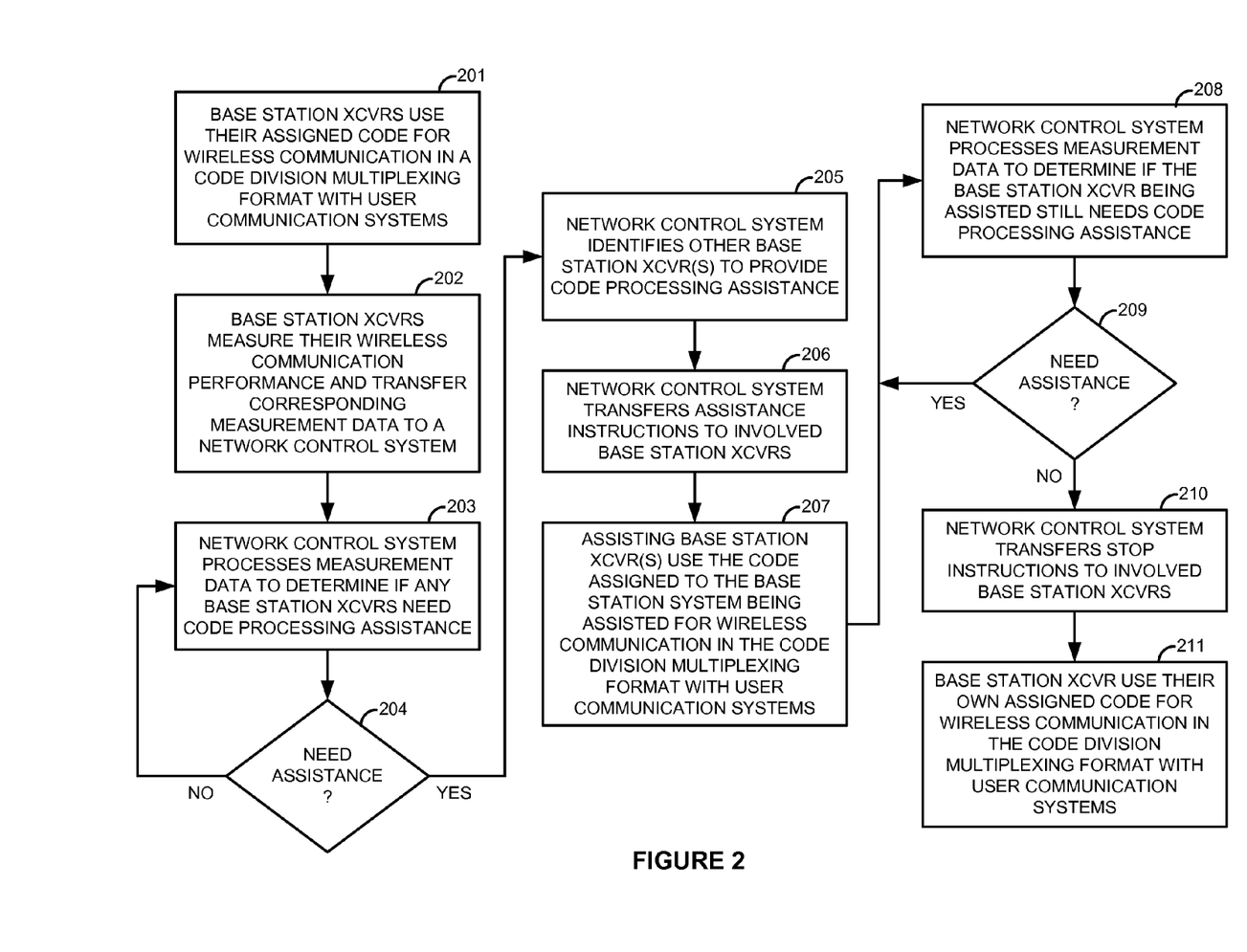
FIG. 2 illustrates a method of operating a communication system to provide base station code processing assistance for a code division multiplex format.

FIG. 2 illustrates a method of operating a communication system to provide base station code processing assistance for a code division multiplex format. Base station transceivers each have their own assigned code that they use to exchange wireless communications in the code division multiplexing format with user communication systems (201). The base station transceivers also measure their wireless communication performance and transfer corresponding measurement data to a network control system (202).

The network control system processes the measurement data from the base station transceivers to determine if one of base station transceivers needs code processing assistance (203). For example, one of the base stations may have very high radio noise levels and very poor signal-to-noise ratios. If one of the base station transceivers needs code processing assistance (204), then the network control system selects one or more of the other base stations to render that assistance (205). This selection is typically based on identifying proximate base station transceivers whose measurement data does not indicate any significant problems. For example, the selected base station transceiver may be physically adjacent and have low radio noise levels and good signal-to-noise ratios.

The network control system then transfers appropriate assistance instructions to involved base station transceivers (206). In response to the assistance instructions, the assisting base station transceiver uses the code assigned to the base station transceiver being assisted to receive wireless communications and provide code processing assistance (207).

The network control system processes the measurement data from the base station transceiver being assisted to determine when it no longer needs assistance (208). For example, the measured values for radio noise and signal-to-noise ratio may return to acceptable levels. If the base station transceiver no longer needs assistance (209), then the network control system transfers the appropriate instructions to the involved base station transceivers to stop the code processing assistance (210). In response to the instruction, the assisting base station transceiver no longer provides the code processing assistance (211).

Figure 3:
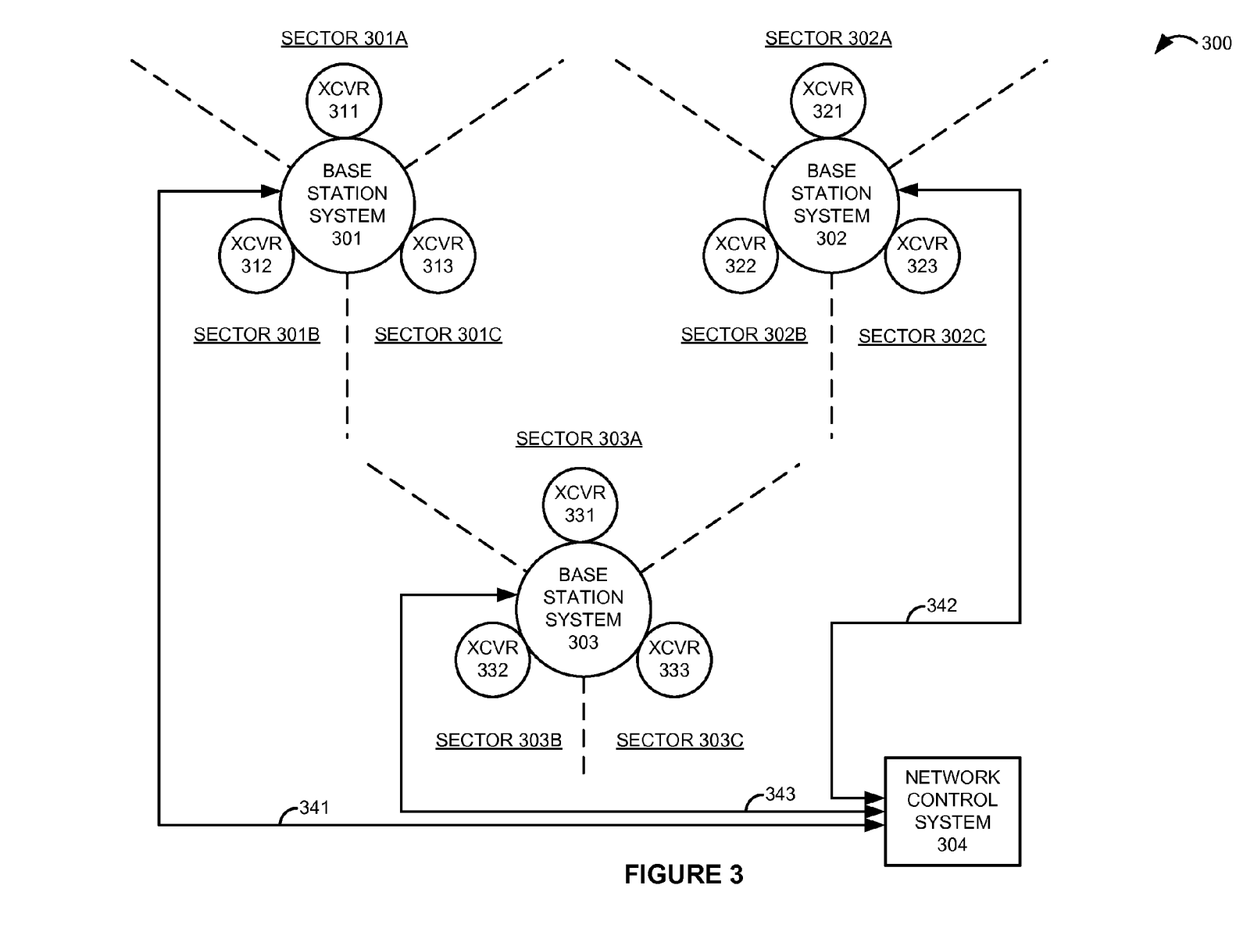
FIG. 3 illustrates a Code Division Multiple Access (CDMA) communication system that provides base station code processing assistance.

FIG. 3 illustrates CDMA communication system 300 that provides base station code processing assistance. CDMA communication system 300 is an example of communication system 100, although system 100 may use other configurations and operations. CDMA communication system 300 comprises CDMA base station systems 301-303 and network control system 304. CDMA base station systems 301-303 and network control system 304 communicate over respective control links 341-343. CDMA base station system 301 includes CDMA transceivers 311-313 that serve respective sectors 301A, 301B, and 301C. CDMA base station system 302 includes CDMA transceivers 321-323 that serve respective sectors 302A, 302B, and 302C. CDMA base station system 303 includes CDMA transceivers 331-333 that serve respective sectors 303A, 303B, and 303C.

Each one of CDMA transceivers 311-313, 321-323, and 331-333 uses unique CDMA codes, such as public long codes, to receive session set-up requests from user communication devices. Each one of CDMA transceivers 311-313, 321-323, and 331-333 also measures reverse noise for their sectors. Base station systems 301-303 transfer the measured reverse noise values for their respective transceivers to network control system 304 over control links 341-343. Network control system 304 compares these reverse noise values to an assistance threshold to determine if any sectors need code processing assistance.

Consider an example where sector 302B that is served by CDMA transceiver 322 has a reverse noise value that exceeds the assistance threshold. Network control system 304 accesses a data structure that associates a sector 302B with the potential CDMA transceivers that could provide code processing assistance. In this example, CDMA transceivers 313, 321, 323, and 331 are the potential transceivers to provide assistance due to their proximity to sector 302B. These proximity-based associations could be maintained in a look-up table at network control system 304.

Network control system 304 then compares the reverse noise levels for the potential assisting transceivers to another threshold to determine if any of these potential CDMA transceivers should not render assistance because of their own reverse noise issues. In this example, CDMA transceivers 321 and 331 have undesirable reverse noise levels and are not selected. CDMA transceivers 313 and 323 have acceptable reverse noise levels to provide assistance and are selected.

Network control system 304 transfers an instruction to base station system 301 over control link 341 indicating that transceiver 313 should decode wireless signals with the CDMA code(s) for transceiver 322, and that base station system 301 should forward any decoded session requests to base station system 302. Likewise, network control system 304 transfers an instruction to base station system 302 over control link 342 indicating that transceiver 323 should decode wireless signals with the CDMA code(s) for transceiver 322, and base station system 302 should handle these session requests.

Due to the high reverse noise level, CDMA transceiver 322 may fail to properly receive a session request from a user in sector 302B. If the user is near the boundary with sector 301C, then transceiver 313 may be able to decode the session request. Transceiver 313 provides the decoded session request to base station system 301, and base station system 301 forwards the session request to base station system 302 over control links 341-342. Base station system 302 acts on the session request. Likewise, if the user is near the boundary with sector 302C, then transceiver 323 may be able to decode the session request for transceiver 322. Transceiver 323 provides the decoded session request to base station system 302 which acts on the session request.

During the code processing assistance, transceivers 313 and 323 determine performance information, such as signal strength and noise levels, for the wireless communications that support the code processing assistance. Corresponding base station systems 301 and 302 transfer these performance measurements to network control system 304. Network control system 304 may use these performance measurements to prolong or end the code processing assistance.

Thus, it should be appreciated that noise values and/or other metrics are monitored to identify base station transceivers that need assistance and to identify base station transceivers that can render the assistance. The assisting base stations are then directed to provide the code processing assistance. The assisting base stations reconfigure a portion of their processing circuitry to decode the code(s) of the base station system in need of assistance. The assisting base stations then forward any corresponding set-up requests to the base station system being assisted.

Figure 4:
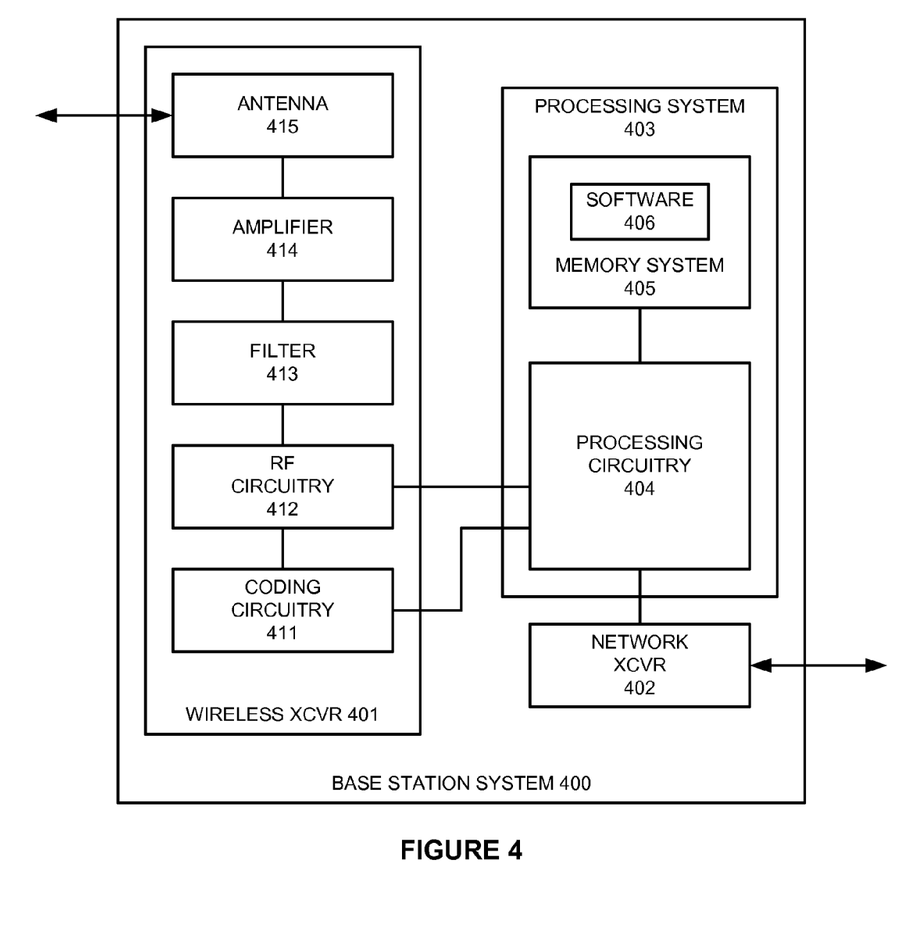
FIG. 4 illustrates a base station system that provides base station code processing assistance.

FIG. 4 illustrates base station system 400 to provide base station code processing assistance. Base station system 400 is an example of base station transceivers 101-102 and base station systems 301-303, although these transceivers and systems may use alternative configurations. Base station system 400 comprises wireless transceiver 401, network transceiver 402, and processing system 403. Processing system 403 comprises processing circuitry 404 and memory system 405 that stores operating software 406. Processing system 403 is linked to transceivers 401-402. Base station system 400 may include additional transceivers and other well-known components that are not shown for clarity, such as routers, servers, computer systems, databases, and power systems.

Wireless transceiver 401 comprises coding circuitry 411, Radio Frequency (RF) circuitry 412, filter 413, amplifier 414, and antenna 415. Coding circuitry 411 implements a CDMA format by coding and decoding user communications using short codes, long codes, and Walsh codes. In particular, coding circuitry 411 is configured to allocate processing resources to decode signals that use the CDMA codes of other transceivers (in addition to its primary task of encoding and decoding signals using its own CDMA codes). RF circuitry 412 performs modulation and demodulation across the carrier frequency band. RF circuitry 412 can also measures various wireless communication performance attributes, such as reverse noise and signal-to-noise ratio. Filter 413 attenuates undesirable signal energy outside of the carrier frequency band. Amplifier 414 boosts the energy of signals for wireless transmission and boosts the energy of received signals. Antenna 415 receives wireless signal energy over the air and propagates wireless signal energy into the air for wireless signal transmission. Wireless transceiver 401 may also include signal processing circuitry, software, and/or some other communication components.

Network transceiver 402 comprises a physical communication port, signal processing circuitry, software, and/or some other communication components. Network transceiver 402 may use various protocols, such as Internet Protocol (IP), Time Division Multiplex (TDM), Ethernet, wireless, or some other network communication format—including combinations thereof. Network transceiver 402 exchanges user communications and control data with network systems. In particular, network transceiver 402 exchanges measurement data and instructions with a network control system as described herein for base station transceivers 101-102 and base station systems 301-303. Network transceiver 402 also forwards set-up requests to the base station being assisted.

Processing circuitry 404 comprises microprocessor and other circuitry that retrieves and executes operating software 406 from memory system 405. Memory system 405 comprises a computer-readable storage medium, such as a disk drive, flash drive, data storage circuitry, or some other memory apparatus. Memory system 405 could be a single device or be distributed across multiple devices. Processing circuitry 404 is typically mounted on one or more circuit boards that may also hold memory system 405 and portions of communication transceivers 401-402.

Operating software 406 comprises computer programs, firmware, or some other form of computer-readable processing instructions. Operating software 406 may include an operating system, utilities, drivers, network interfaces, applications, or some other type of software. When executed by processing circuitry 404, operating software 406 directs processing system 403 to operate base station system 400 as described herein for base station transceivers 101-102 and base station systems 301-303. In particular, operating software 406 directs processing system 403 to provide or accept code processing assistance as described herein.

Figure 5:
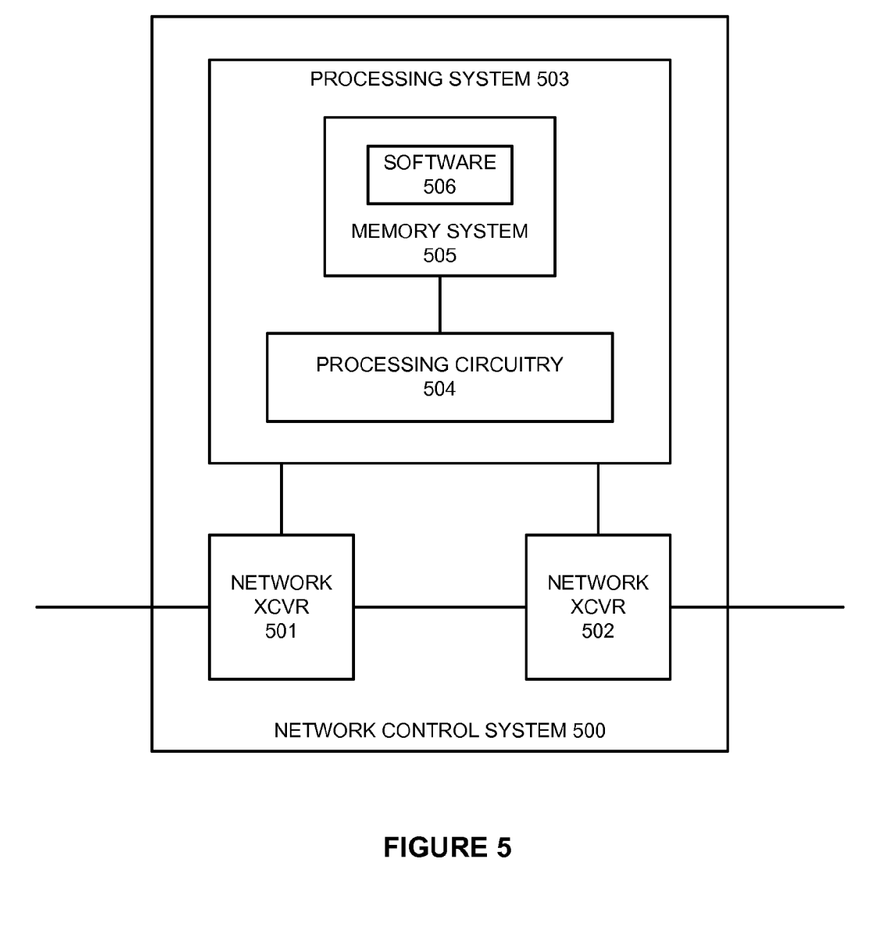
FIG. 5 illustrates a network control system that provides base station code processing assistance.

FIG. 5 illustrates network control system 500 to provide base station-to-base station code processing assistance. Network control system 500 is an example of network control systems 103 and 304, although systems 103 and 304 may use alternative configurations. Network control system 500 could be a discrete system, a distributed system, and/or could be integrated into other systems, such as in the base station systems themselves. Network control system 500 comprises network transceivers 501-502 and processing system 503. Processing system 503 comprises processing circuitry 504 and memory system 505 that stores operating software 506. Processing system 503 is linked to transceivers 501-502, and transceivers 501-502 are typically linked together as well. Network control system 500 may include other well-known components that are not shown for clarity, such as routers, servers, computer systems, databases, and power systems.

Network transceivers 501-502 each comprise a physical communication port, signal processing circuitry, software, and/or some other communication components. Network transceivers 501-502 may use various protocols, such as IP, TDM, Ethernet, wireless, or some other network communication format—including combinations thereof. Network transceivers 501-502 exchange control data, instructions, and other messages with base station transceivers and systems as described herein.

Processing circuitry 504 comprises microprocessor and other circuitry that retrieves and executes operating software 506 from memory system 505. Memory system 505 comprises a computer-readable storage medium, such as a disk drive, flash drive, data storage circuitry, or some other memory apparatus. Memory system 505 could be a single device or be distributed across multiple devices. Processing circuitry 504 is typically mounted on one or more circuit boards that may also hold memory system 505 and portions of transceivers 501-502.

Operating software 506 comprises computer programs, firmware, or some other form of computer-readable processing instructions. Operating software 506 may include an operating system, utilities, drivers, network interfaces, applications, or some other type of software. When executed by processing circuitry 504, operating software 506 directs processing system 503 to operate network control system 500 as described herein for network control systems 103 and 304. In particular, network control system identifies and directs the base station transceivers that need code processing assistance and the base station transceivers that provide the code processing assistance.

Referring back to FIG. 1, user communication systems 111-113 each comprises an antenna and RF communication circuitry for wireless communication. The RF communication circuitry typically includes an amplifier, filter, RF modulator, and signal processing circuitry. The signal processing circuitry implements a code division multiplexing format. User communication systems 111-113 may also comprise processing circuitry, memory, software, and a user interface.

Base station transceivers 101-102 each comprise antennas and RF communication circuitry for wireless communication. The RF communication circuitry typically includes amplifiers, filters, RF modulators, and signal processing circuitry. The signal processing circuitry implements a code division multiplexing format. Base station transceivers 101-102 also comprise processing circuitry, memory, software, and network communication interfaces. Base station transceivers 101-102 may also include routers, servers, call processors, computer systems, communication links, and other communication network elements.

Network control system 103 comprises processing circuitry, memory, software, and network communication interfaces.

Wireless communications 121-124 use the air or space as the transport media. Wireless communications 121-124 may use various protocols that use code division multiplexing, such as CDMA, Evolution Data Only (EVDO), Worldwide Interoperability for Microwave Access (WIMAX), or some other communication format that uses code division multiplexing. Control information 131-133 uses metal, glass, air, space, or some other material as the transport media. Control information 131-133 may use various communication protocols, such as TDM, IP, Ethernet, wireless, or some other communication format—including combinations thereof. Control information 131-133 may traverse direct communication links or may traverse a combination of links, networks, systems, and devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   in a first base station transceiver, wirelessly receiving communications from a first user in a code division multiplexing format using a first spreading code assigned to the first base station transceiver, and determining a first wireless communication performance measurement for the first base station transceiver;
   in a second base station transceiver, wirelessly receiving communications from a second user in the code division multiplexing format using a second spreading code assigned to the second base station transceiver, and determining a second wireless communication performance measurement for the second base station transceiver;
   in a network control system, selecting the second base station transceiver to assist the first base station transceiver in handling communications that use the first spreading code based on the first wireless communication performance measurement and the second wireless communication performance measurement, and in response, transferring an assistance instruction; and
   in the second base station transceiver, receiving the assistance instruction, and in response, wirelessly receiving communications from a third user in the code division multiplexing format using the first spreading code assigned to the first base station transceiver by at least re-allocating spreading code processing circuitry in the second base station transceiver to decode the first spreading code assigned to the first base station transceiver.

2. The method of claim 1 further comprising:
   in the second base station transceiver, wherein wirelessly receiving communications from the third user comprises receiving a session request from the third user, and further comprising transferring the session request for delivery to the first base station transceiver; and
   in the first base station transceiver, receiving the session request, and in response, wirelessly communicating with the third user to register the third user and to provide a communication service to the third user.

3. The method of claim 1 wherein:
   in the second base station transceiver, wherein wirelessly receiving communications from the third user comprises wirelessly communicating with the third user to register the third user; and
   in the first base station transceiver, after the registration, wirelessly communicating with the third user to provide a communication service to the third user.

4. The method of claim 1 wherein:
   in the second base station transceiver, wirelessly receiving communications from the third user comprises wirelessly communicating with the third user to register the third user and to provide a communication service to the third user.

5. The method of claim 1 wherein the first wireless communication performance measurement for the first base station transceiver and the second wireless communication performance measurement for the second base station transceiver comprise radio frequency noise metrics.

6. The method of claim 1 wherein the first wireless communication performance measurement for the first base station transceiver and the second wireless communication performance measurement for the second base station transceiver comprise signal-to-noise ratios.

7. The method of claim 1 further comprising:
   in the first base station transceiver, wirelessly broadcasting a first signal indicating the first spreading code assigned to the first base station transceiver;
   in the second base station transceiver, wirelessly broadcasting a second signal indicating the second spreading code assigned to the second base station transceiver.

8. The method of claim 1 further comprising:
   in the second base station transceiver, determining a signal strength indicator for the wirelessly received user signals using the first spreading code assigned to the first base station transceiver and transferring the strength indicator for delivery to the network control system.

9. The method of claim 1 further comprising:
   in the second base station transceiver, determining a noise indicator for the wirelessly received user signals using the first spreading code assigned to the first base station transceiver and transferring the noise indicator for delivery to the network control system.

10. A communication system comprising:
   a first base station transceiver configured to wirelessly receive communications from a first user in a code division multiplexing format using a first spreading code assigned to the first base station transceiver, and to determine a first wireless communication performance measurement for the first base station transceiver;
   a second base station transceiver configured to wirelessly receive communications from a second user in the code division multiplexing format using a second spreading code assigned to the second base station transceiver, and to determine a second wireless communication performance measurement for the second base station transceiver;

a network control system configured to select the second base station transceiver to assist the first base station transceiver in handling communications that use the first spreading code based on the first wireless communication performance measurement and the second wireless communication performance measurement, and in response, to transfer an assistance instruction; and the second base station transceiver configured to receive the assistance instruction, and in response, to wirelessly receive communications from a third user in the code division multiplexing format using the first spreading code assigned to the first base station transceiver by at least re-allocating spreading code processing circuitry in the second base station transceiver to decode the first spreading code assigned to the first base station transceiver.

11. The communication system of claim 10 wherein:

the second base station transceiver is configured to receive a session request from the third user using the first spreading code assigned to the first base station transceiver and transfer the session request for delivery to the first base station transceiver; and the first base station transceiver is configured to receive the session request, and in response, wirelessly communicate with the third user to register the third user and to provide a communication service to the third user.

12. The communication system of claim 10 wherein:

the second base station transceiver is configured to wirelessly communicate with the third user to register the third user; and the first base station transceiver is configured to wirelessly communicate with the third user to provide a communication service to the third user after the registration.

13. The communication system of claim 10 wherein:

the second base station transceiver is configured to wirelessly communicate with the third user to register the third user and to provide a communication service to the third user.

14. The communication system of claim 10 wherein the first wireless communication performance measurement for the first base station transceiver and the second wireless communication performance measurement for the second base station transceiver comprise radio frequency noise metrics.

15. The communication system of claim 10 wherein the first wireless communication performance measurement for the first base station transceiver and the second wireless communication performance measurement for the second base station transceiver comprise signal-to-noise ratios.

16. The communication system of claim 10 wherein:

the first base station transceiver is configured to wirelessly broadcast a first signal indicating the first spreading code assigned to the first base station transceiver;

the second base station transceiver is configured to wirelessly broadcast a second signal indicating the second spreading code assigned to the second base station transceiver.

17. The communication system of claim 10 wherein:

the second base station transceiver is configured to determine a signal strength indicator for the wirelessly received user signals using the first spreading code assigned to the first base station transceiver and transfer the strength indicator for delivery to the network control system.

18. The communication system of claim 10 wherein:

the second base station transceiver is configured to determine a noise indicator for the wirelessly received user signals using the first spreading code assigned to the first base station transceiver and transfer the noise indicator for delivery to the network control system.

* * * * *